United States Patent
Miyoshi

(10) Patent No.: US 6,667,733 B2
(45) Date of Patent: Dec. 23, 2003

(54) POINTING DEVICE

(75) Inventor: Toshiharu Miyoshi, Higashiosaka (JP)

(73) Assignee: Hosiden Corporation, Osaka (JP)

( * ) Notice: Subject to any disclaimer, the term of this patent is extended or adjusted under 35 U.S.C. 154(b) by 182 days.

(21) Appl. No.: 09/765,440

(22) Filed: Jan. 22, 2001

(65) Prior Publication Data
US 2001/0009412 A1 Jul. 26, 2001

(30) Foreign Application Priority Data
Jan. 21, 2000 (JP) ........................................ 2000-013188

(51) Int. Cl.$^7$ ................................................. G09G 5/00
(52) U.S. Cl. ........................ 345/156; 345/157; 345/158; 345/159; 345/160; 345/161; 345/162; 345/163; 345/164; 345/165; 345/166; 345/167; 340/706; 340/709; 74/471 XY
(58) Field of Search ................................ 345/156, 157, 345/158, 163, 166, 167, 161, 165, 164; 74/471 XY

(56) References Cited
U.S. PATENT DOCUMENTS

| | | | | |
|---|---|---|---|---|
| 5,293,158 A | * | 3/1994 | Soma | 345/161 |
| 5,327,162 A | * | 7/1994 | Soma | 345/161 |
| 5,696,537 A | * | 12/1997 | Solbjell | 345/164 |
| 5,808,603 A | * | 9/1998 | Chen | 345/157 |
| 6,034,670 A | * | 3/2000 | Chen | 345/166 |
| 6,091,401 A | * | 7/2000 | Chen et al. | 345/156 |

* cited by examiner

*Primary Examiner*—Xiao Wu
*Assistant Examiner*—Jennifer T. Nguyen
(74) *Attorney, Agent, or Firm*—Armstrong, Kratz, Quintos, Hanson & Brooks, LLP

(57) ABSTRACT

The pointing device of the present invention has a case fixed to a mounting substrate. A sliding-type operating body and moving bodies for moving linearly in X-Y directions in the case as the operating body is slid are provided. Respective side portions of the moving bodies project sideways from the case and lower faces of respective projecting portions face a surface of the mounting substrate. By bringing contacts mounted to the lower faces of the respective projecting portions into contact with a resistor circuit formed on the surface of the mounting substrate, volume portions are formed at two orthogonal side portions. The two orthogonal side portions overhang sideways like eaves and springs for origin returning and are disposed between respective overhanging portions and the respective projecting portions.

1 Claim, 15 Drawing Sheets

POINTING DEVICE

TECHNICAL FIELD

The present invention relates to a pointing device used for inputting a signal in X-Y directions in various electronic equipment such as a remote control unit, a game machine, and a cellular phone and more specifically to a pointing device of a sliding type in which an operating body is slid along a plate face of a mounting substrate.

PRIOR ART

A pointing device of a sliding type that is used as an input device of a signal in X-Y directions basically has a case fixed to a substrate, a sliding-type operating body that is mounted to the case for inputting the signal in the X-Y directions and is slid in all directions around itself and along a surface of the substrate, a pair of moving bodies moving linearly in an X direction and a Y direction in the case as the operating body is slid, and a pair of signal output means for detecting moving positions of the pair of moving bodies and outputting electric signals in the X-Y directions.

As the signal output means, there is known means based on a magnetic sensor in addition to a volume. However, the means based on the magnetic sensor is large and expensive. Therefore, it is preferable in view of miniaturization and cost-reduction of the device to use signal output means formed of volume such as an X-Y direction input device disclosed in Japanese Patent Application Laid-open Publication No. 5-324187.

In the X-Y direction input device disclosed in Japanese Patent Application Laid-open Publication No. 5-324187, contacts are mounted to a pair of moving bodies housed in a case and each the contact comes into sliding contact with a resistor circuit on a surface of a special substrate housed in the case with the moving bodies, thereby forming the volumes in the case. The volumes in the case are connected to an electric circuit on a surface of a mounting substrate to which the case is fixed through a connector or by soldering.

Such a prior-art pointing device is smaller and less expensive than a device for which magnetic signal output means is used because the volumes are used as the signal output means. However, there are problems of increase in the number of parts and increase in a height of the device because the special substrate is provided in the case so as to form the volumes. Moreover, because it is necessary to electrically connect the special substrate in the case to the mounting substrate to which the case is fixed in installation of the device, there are also problems of increase in the number of the parts and increase in the number of man-hours required for the installation operation.

The present invention has been accomplished with the above circumstances in view and it is an object of the present invention to provide a pointing device in which the volumes are used as the signal output means and the number of the parts, the thickness of the device, and the number of man-hours required for the installation operation can be reduced as compared with the prior-art device for which the volumes are used.

SUMMARY OF THE INVENTION

To achieve the above object, according to the present invention, there is provided a pointing device comprising a case fixed to a substrate, a sliding-type operating body that is mounted to the case for inputting a signal in X-Y directions and is slid in all directions around itself and along a surface of the substrate, a pair of moving bodies for moving linearly in X and Y directions in the case as the operating body is slid, one side portions of the respective moving bodies projecting to an outside of the case to face the surface of the substrate, and contacts in a pair that are respectively mounted to respective projecting portions of the moving bodies in the pair and that form volumes by coming into sliding contact with a resistor circuit formed on the surface of the substrate.

In the pointing device according to the present invention, the respective one side portions of the moving bodies in the pair housed in the case project to the outside of the case and the contacts mounted to the respective projecting portions come into sliding contact with the resistor circuit formed on the surface of the substrate to which the case is fixed, thereby forming the volumes. Therefore, a special substrate in the case is unnecessary. It is unnecessary to connect the device to the substrate by soldering or through the connector.

In the pointing device according to the present invention, it is preferable that springs for resiliently retaining the moving bodies in the pair in an origin position are provided. As a result, the operating body automatically returns to the origin position and operability is improved.

With regard to the springs, it is preferable that two side portions substantially perpendicular to each other of the case overhang sideways over the respective projecting portions of the moving bodies in the pair and the springs are respectively provided between the overhanging portions and the projecting portions. As a result, increase in size of the pointing device due to provision of the springs can be minimized.

Figure 1:
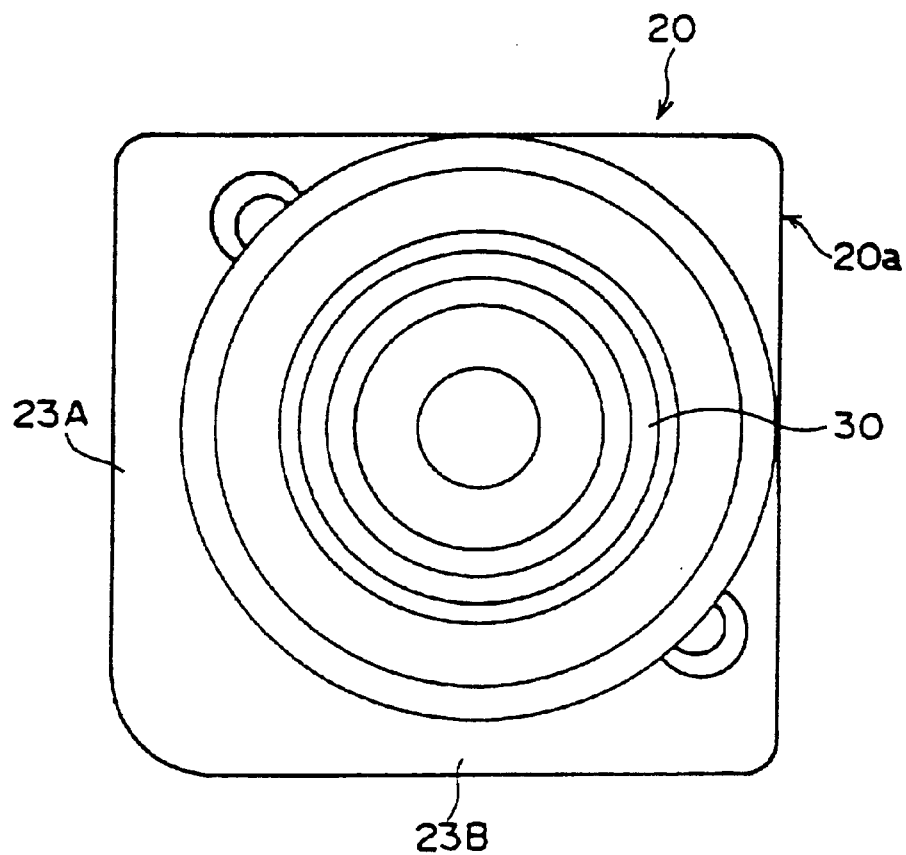
FIG. 1 is a plan view of a pointing device according to an embodiment of the present invention.
Figure 1:
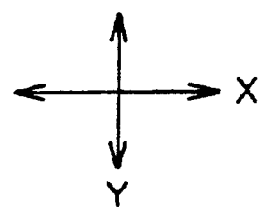
Figure 2:
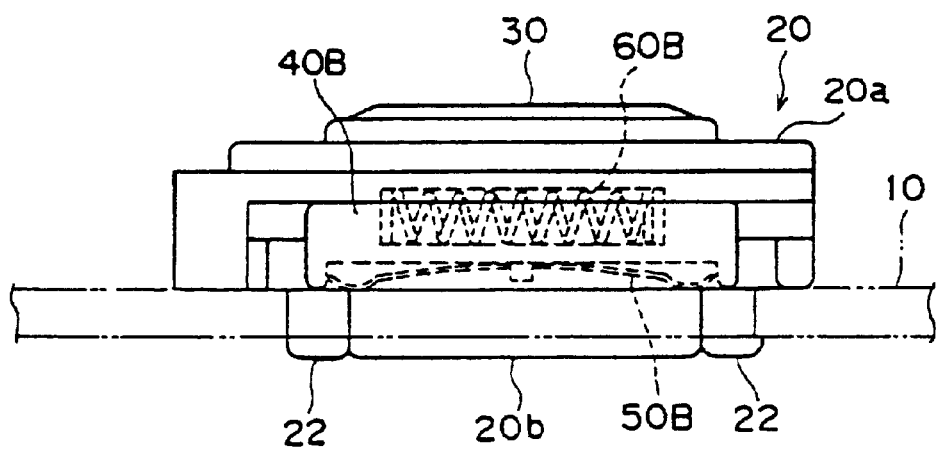
FIG. 2 is a front view of the pointing device.
Figure 3:
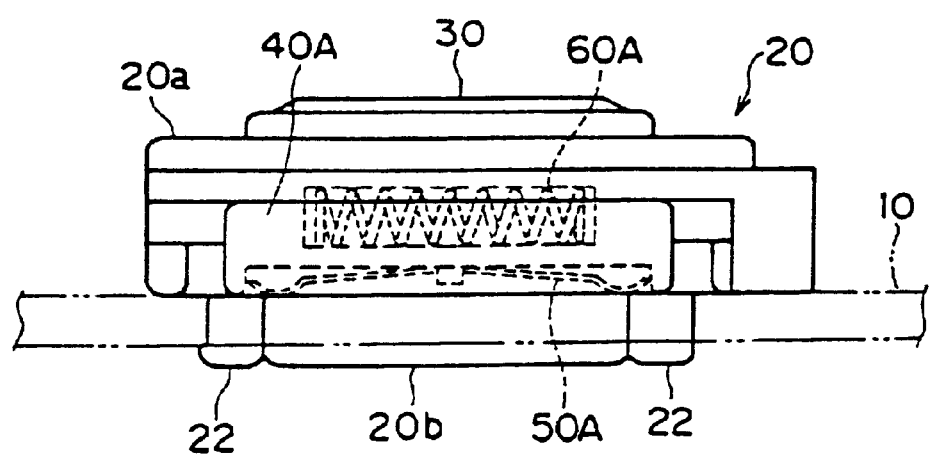
FIG. 3 is a left side view of the pointing device.
Figure 4:
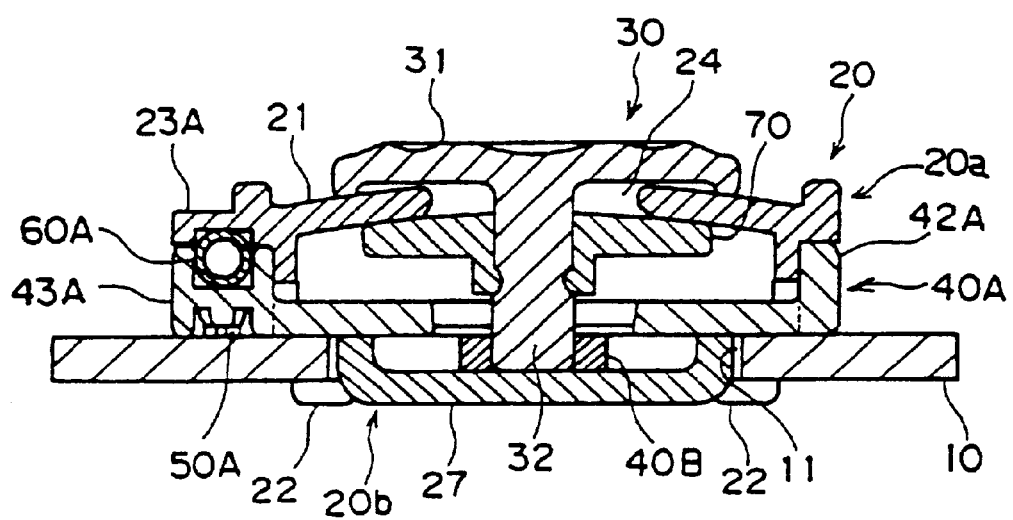
FIG. 4 is a vertical sectional front view of the pointing device.

EXPLANATION OF THE REFERENCE NUMERALS 10 substrate
20 case
20a upper case 20b lower case
21, 27 body portions
22, 28 connecting portions
23A, 23B overhanging portions
26A pushing portion
30 operating body
40A, 40B moving bodies
41A, 41B body portions
42A, 42B guide portions
43A, 43B projecting portions (side end portions)
46A, 46B first housing portions
47A, 47B second housing portions
50A, 50B contacts
60A, 60B springs
70 coming-off preventing member

EMBODIMENT OF THE INVENTION

An embodiment of the present invention will be described below based on the drawings. A pointing device described here includes, as shown in FIGS. 1 to 4, a case 20 fixed to a mounting substrate 10, an operating body 30 of a sliding type that is mounted to the case 20 for inputting a signal in X-Y directions, a pair of upper and lower moving bodies 40A and 40B for moving linearly in X-Y directions in the case 20 as the operating body 30 is slid, contacts 50A and 50B in a set and respectively mounted to respective one side portions of the moving bodies 40A and 40B for forming volume portions in the X-Y directions at two side portions orthogonal to each other of the case 20, and a set of springs 60A and 60B mounted in the volume portions in the X-Y directions for automatically returning the moving bodies 40A and 40B to an origin position.

The moving body 40A and the contact 50A carry out signal input in a Y direction and the moving body 40B and the contact 50B carry out signal input in an X direction.

Figure 5:
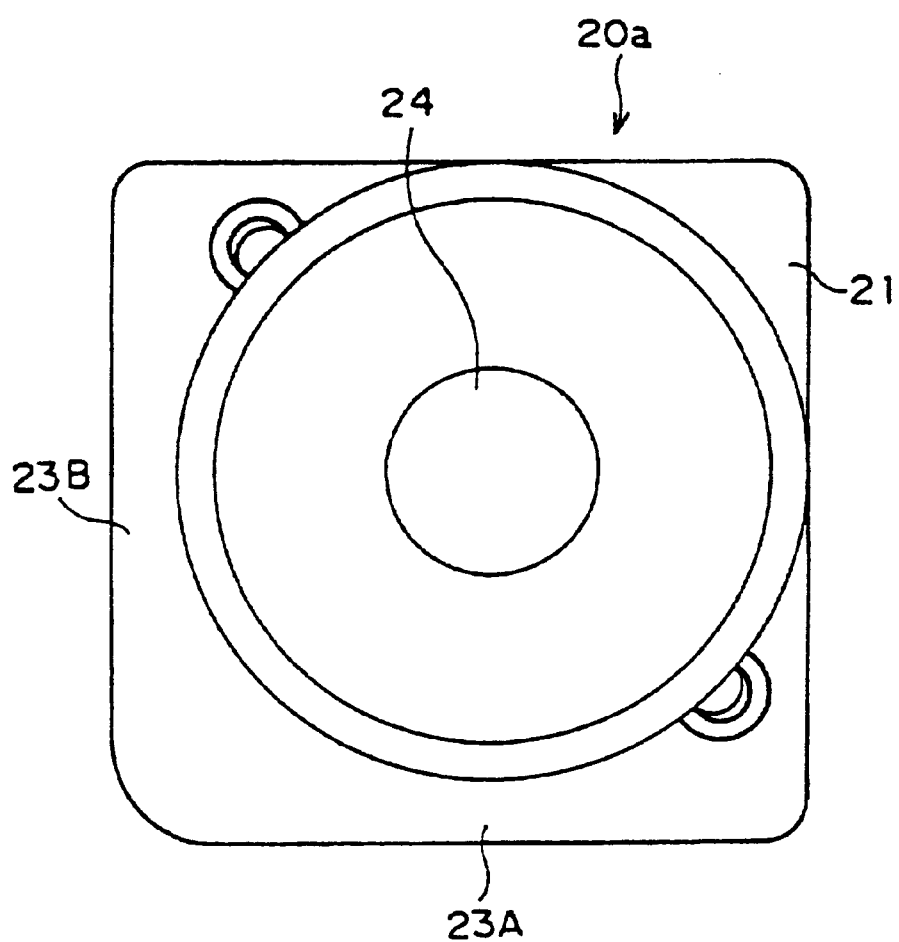
FIG. 5 is a plan view of an upper case used for the pointing device.
Figure 6:
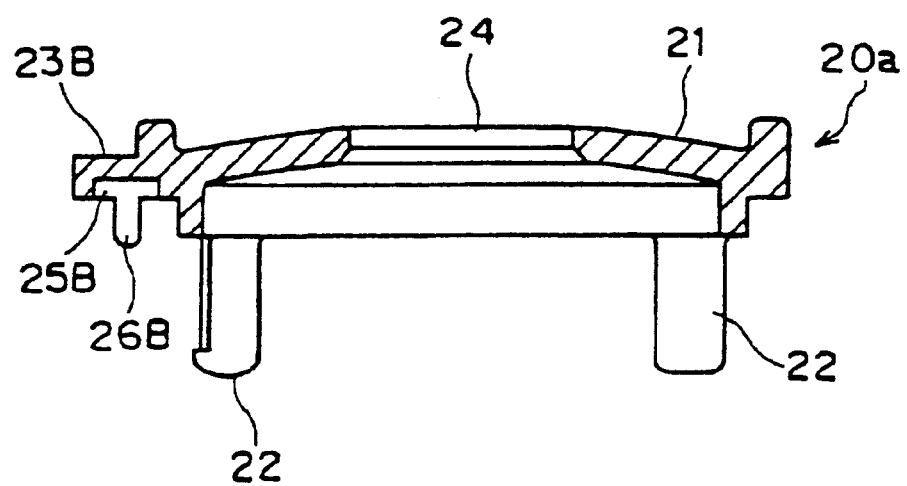
FIG. 6 is a vertical sectional front view of the upper case.
Figure 7:
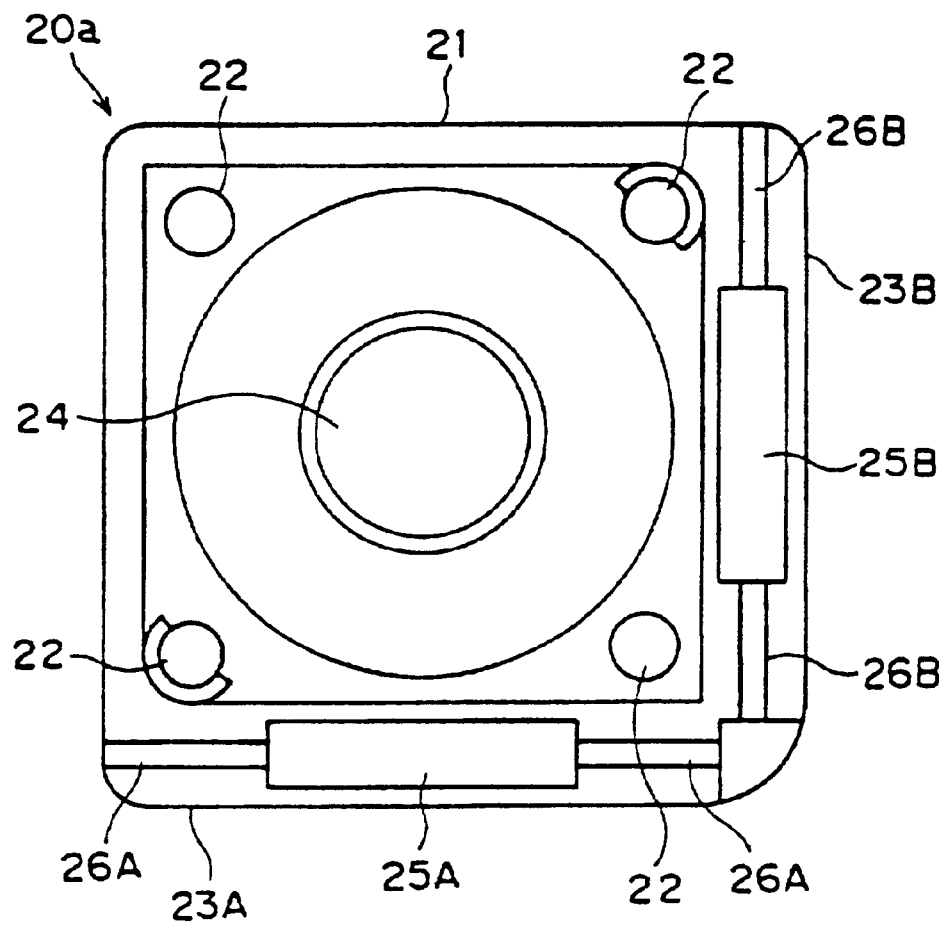
FIG. 7 is a bottom view of the upper case.

The case 20 has a two-piece structure in which an upper case 20a forming a top plate portion and a lower case 20b for forming a bottom plate portion are mounted to each other. The upper case 20a has a body portion 21 formed of a cap substantially in a square shape with an open lower face, four connecting portions 22, 22, . . . in round rod shapes projecting downward from four corner portions of the body 21 to connect the lower case 20b to a lower portion of the body portion 21, and overhanging portions 23A and 23B of a set respectively overhanging sideways like eaves from two side portions orthogonal to each other of the body portion 21 as shown in FIGS. 5 to 7.

A top plate portion of the body portion 21 is in a dome shape that is recessed gently upward and a circular opening portion 24 through which a portion of the operating body 30 is caused to project upward is provided to a central portion of the top plate portion. Shallow recessed portions 25A, 25B in which the springs 60A and 60B are fitted are provided to the lower faces of the overhanging portions 23A and 23B. In order to compress the springs 60A and 60B in movement of the moving bodies 40A and 40B, pushing portions 26A, 26A and 26B, 26B of pairs formed of rib-shaped projections are formed at opposite end portions of the respective lower faces.

Figure 8:
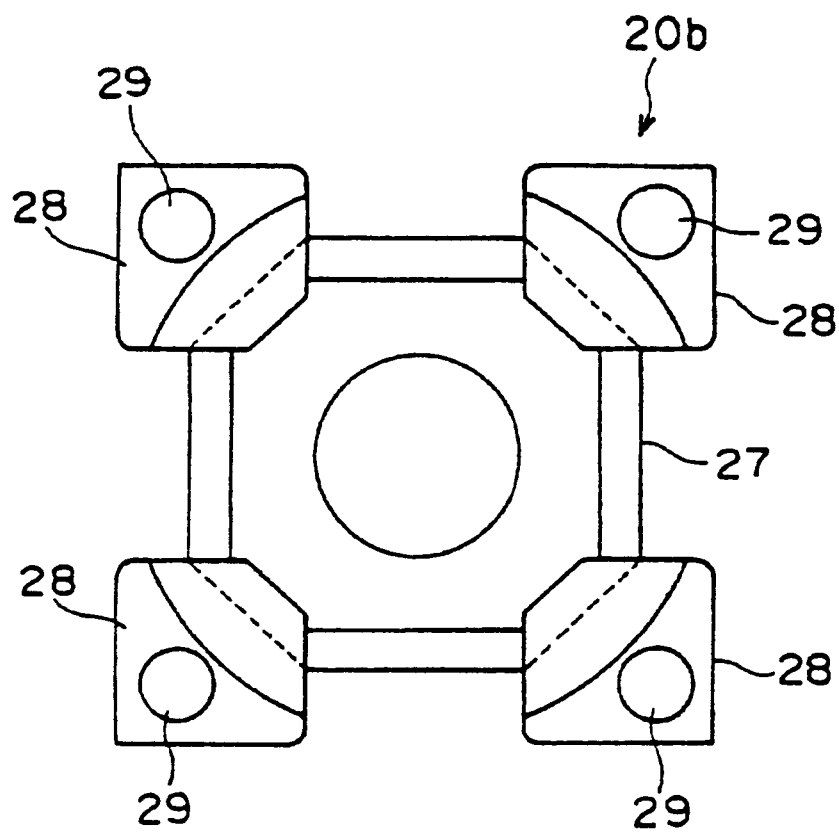
FIG. 8 is a plan view of a lower case used for the pointing device.
Figure 9:
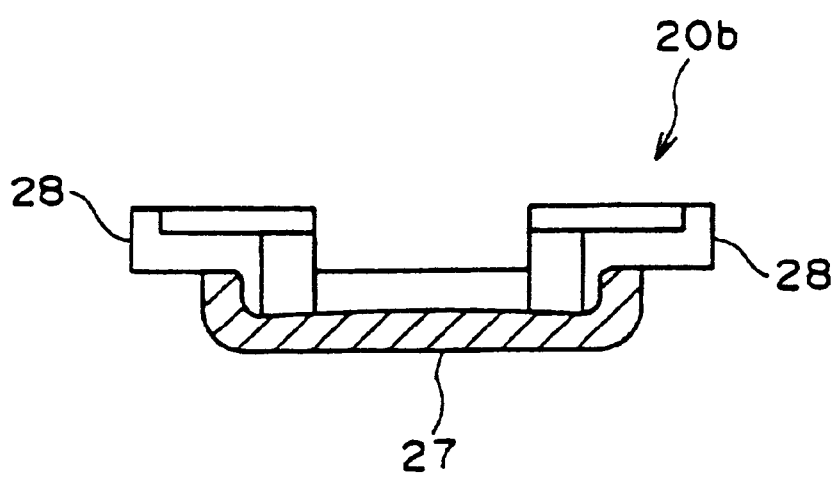
FIG. 9 is a vertical sectional front view of the lower case.

The lower case 20b has a body portion 27 formed of a substantially square shallow container and four connecting portions 28, 28, . . . overhanging outward from four corner portions of the body portion 27 and circular through holes 29 in which the corresponding connecting portions 22 of the upper case 20a are respectively press-fitted are respectively formed at the respective connecting portions 28 as shown in FIGS. 8 and 9.

By pushing the connecting portions 22, 22, . . . of the upper case 20a into the through holes 29, 29, . . . of the lower case 20b, the body portion 27 of the lower case 20b is connected to a lower portion of the body portion 21 of the upper case 20a with a small gap maintained therebetween. In this state, respective tip end portions of the connecting portions 22, 22, . . . project below the connecting portions 28, 28, . . . . By inserting the connecting portions 22, 22, . . . into mounting holes formed on the mounting substrate 10, the case 20 is fixed onto the mounting substrate 10.

In other words, the connecting portions 22, 22, . . . also function as fixing portions for fixing the case 20 onto the mounting substrate 10. For this fixing, turned-up portions are provided to tip ends of the two connecting portions 22, 22 on a diagonal line. An opening portion 11 into which the body portion 27 of the lower case 20b is inserted is formed on an inside of the four mounting holes of the mounting substrate 10 in addition to the four mounting holes into which the connecting portions 22, 22, . . . are inserted (see FIG. 4).

The operating body 30 has a disc-shaped operating portion 31 and a round-rod-shaped shaft portion 32 projecting downward from a central portion of a lower face of the operating portion 31 as shown in FIGS. 1 to 4. The operating portion 31 projects further upward than the body portion 21 of the upper case 20a and has an outer diameter larger than an inner diameter of the opening portion 24 formed at the body portion 21. The shaft portion 32 is inserted through the opening portion 24 into the body portions 21 and 27 of the case 20 and has an outer diameter sufficiently smaller than the inner diameter of the opening portion 24.

The operating body 30 is prevented from coming off by an annular coming-off preventing member 70 fitted over and fixed to the shaft portion 32. In this state, the operating body 30 can be slide in all directions around itself along the surface of the mounting substrate 10. More specifically, the operating body 30 is slid along a curved and dome-shaped top plate portion of the body portion 21.

Figure 10:
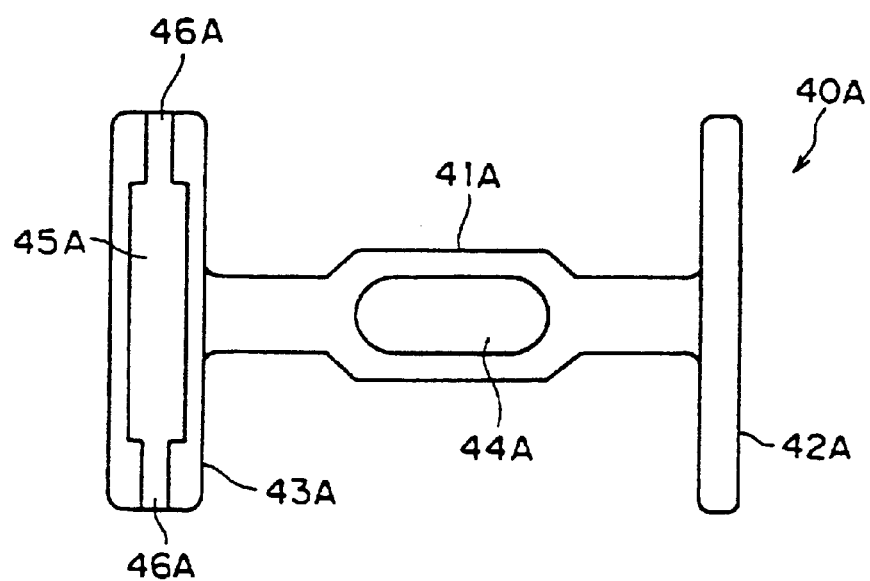
FIG. 10 is a plan view of a moving body in an upper stage used for the pointing device.
Figure 10:
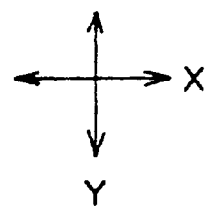
Figure 11:
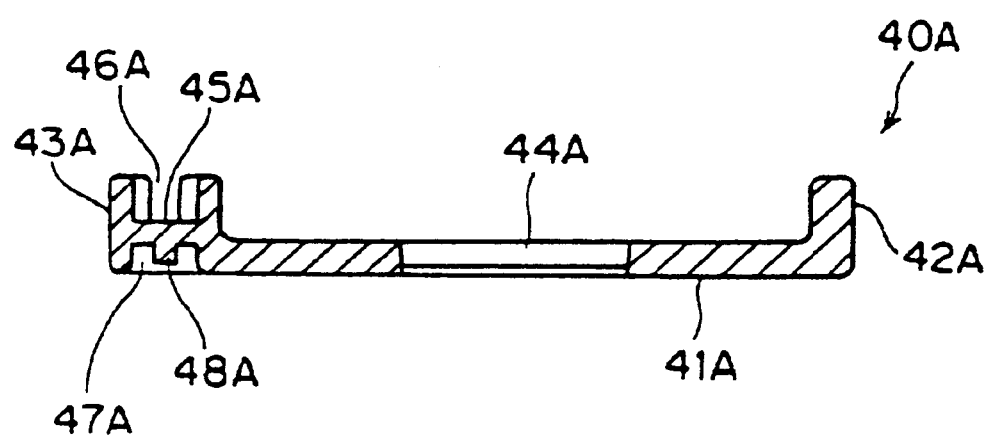
FIG. 11 is a vertical sectional front view of the moving body.
Figure 12:
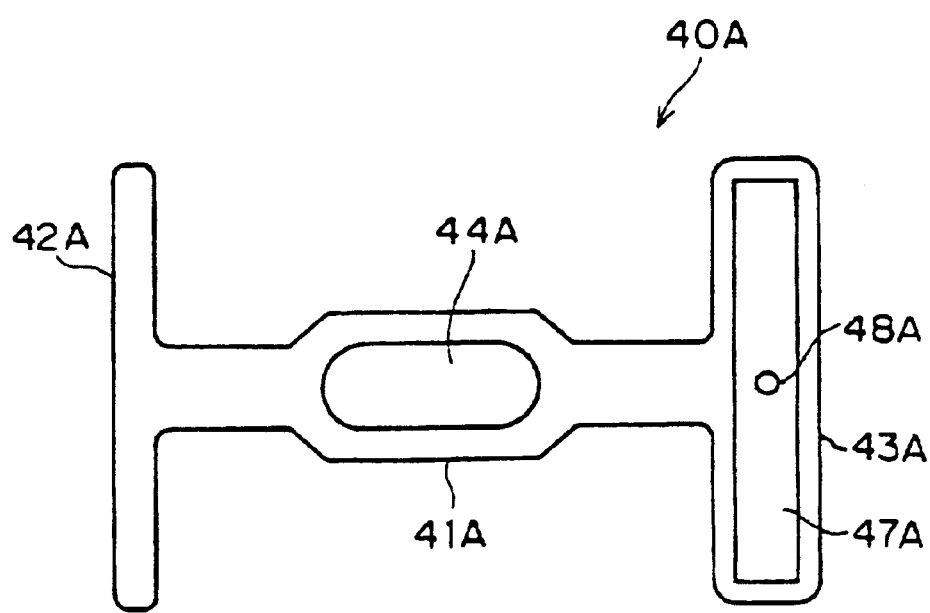
FIG. 12 is a bottom view of the moving body.

In the set of upper and lower moving bodies 40A and 40B, the moving body 40A in an upper stage carries out input of a signal in the Y direction and is movable only in the Y direction. As shown in FIGS. 10 to 12, the moving body 40A has a body portion 41A which extends in a direction (X direction) perpendicular to a moving direction and through a central portion of which the shaft portion 32 of the operating body 30 passes, a guide portion 42A connected to one end portion of the body portion 41A into a T shape, and a projecting portion 43A connected to the other end portion of the body portion 41A into a T shape to form a volume portion.

The body portion 41A is housed in the body portions 21 and 27 of the case 20 and a through hole 44A through which the shaft portion 32 of the operating body 30 passes is formed as an elongated hole that is long in the X direction so as to allow movement of the operating body 40A in the X direction. The guide portion 42A projects to an outside of the case 20 through between the body portions 21 and 27 of the case 20 and comes into contact with an outside face of the body portion 21.

The projecting portion 43A projects to the outside of the case 20 through between the body portions 21 and 27 of the case 20 to come into contact with an outside face of the body portion 21, thereby also functioning as a guide portion and is positioned on a lower side of the one overhanging portion 23A of the upper case 20a, thereby forming one volume portion. On an upper face of the projecting portion 43A that faces the lower face of the overhanging portion 23A, a recessed first housing portion 45A for housing the one spring 60A is formed. On opposite end sides of the first housing portion 45A, slit-shaped recessed portions 46A, 46A in a pair into which the pushing portions 26A, 26A provided to the lower face of the overhanging portion 23A are inserted are respectively formed to be seamlessly connected to the housing portion 45A. On the other hand, on the lower face of the projecting portion 43A, a second housing portion 47A for housing the one contact 50A is formed. A projection 48A for fixing the contact 50A is formed on a ceiling face of the second housing portion 47A.

Figure 13:
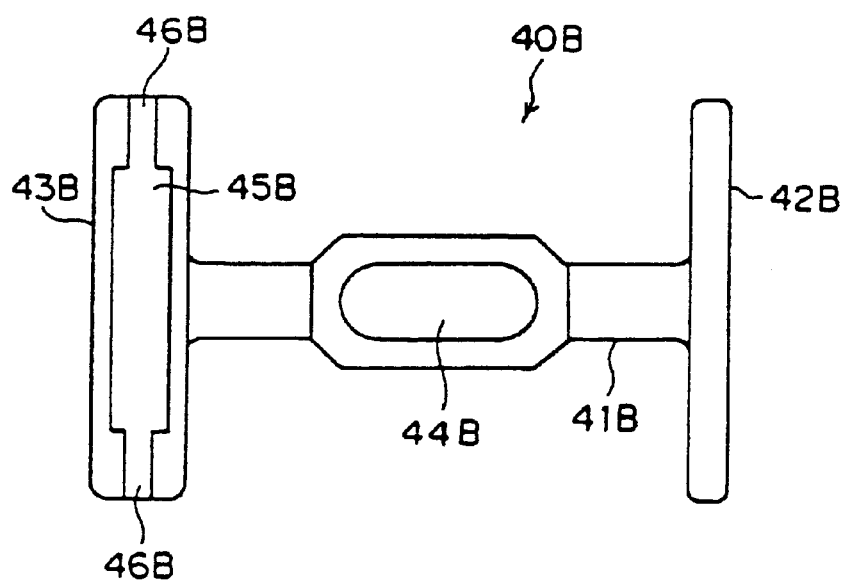
FIG. 13 is a plan view of a moving body in a lower stage used for the pointing device.
Figure 13:
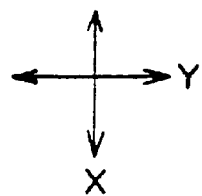
Figure 14:
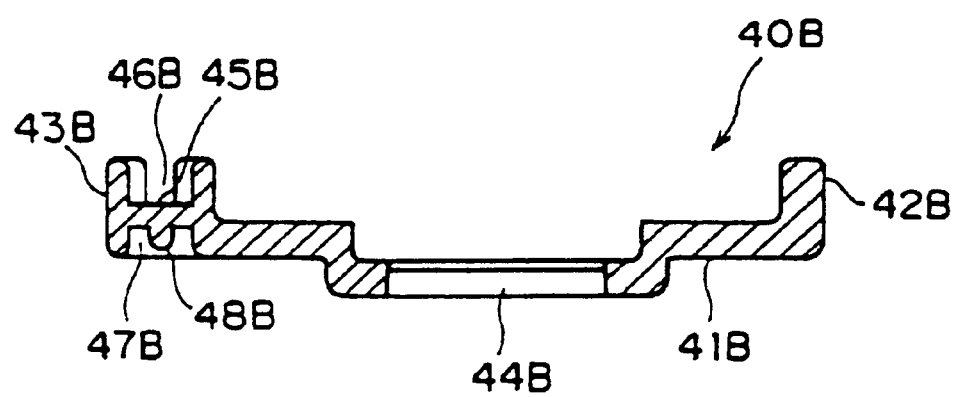
FIG. 14 is a vertical sectional front view of the moving body.
Figure 15:
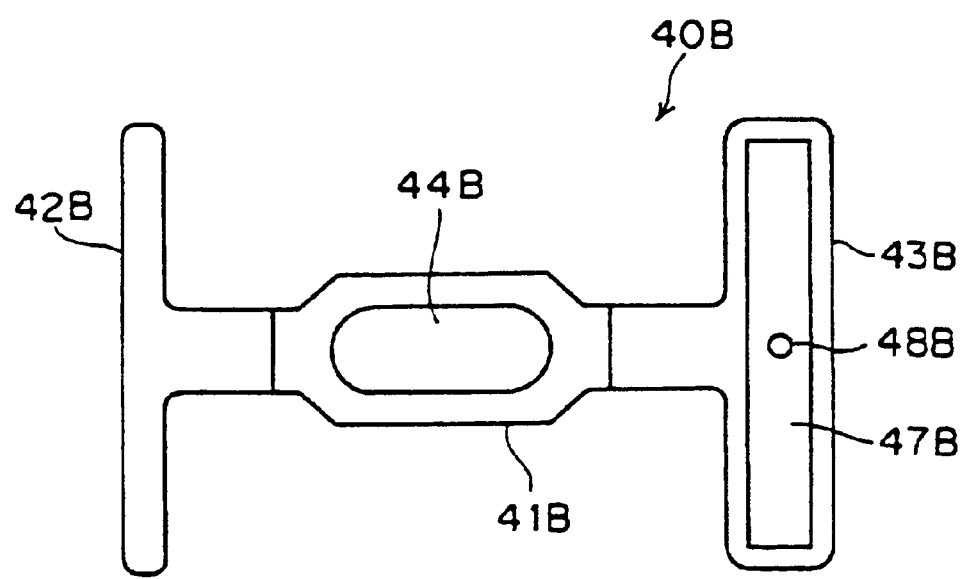
FIG. 15 is a bottom view of the moving body.

The moving body 40B in the lower stage is disposed to be perpendicular to the moving body 40A in the upper stage. The moving body 40B is shown in FIGS. 13 to 15 and has substantially the same structure as the moving body 40A in the upper stage except that the moving body 40B is movable only in the X direction for carrying out input of a signal in the X direction and that a central portion of the body portion 41B is recessed downward by such a thickness as to equalize heights of the guide portion 42B and the projecting portion 43B on opposite sides to each other between the moving body 40B in the lower stage and the moving body 40A in the upper stage.

In other words, the moving body 40B has a body portion 41B which extends in a direction (Y direction) perpendicular to a moving direction and through a central portion of which the shaft portion 32 of the operating body 30 passes, a guide portion 42B connected to one end portion of the body portion 41B into a T shape, and a projecting portion 43B connected to the other end portion of the body portion 41B into a T shape to form a volume portion. The body portion 41B is housed in the body portions 21 and 27 of the case 20 and a through hole 44B through which the shaft portion 32 of the operating body 30 passes is formed as an elongated hole that is long in the X direction so as to allow movement of the operating body 40B in the Y direction. The guide portion 42B projects to an outside of the case 20 through between the body portions 21 and 27 of the case 20 and comes into contact with an outside face of the case 20.

The projecting portion 43B projects to the outside of the case 20 through between the body portions 21 and 27 of the case 20 to come into contact with the outside face of the case 20, thereby also functioning as a guide portion and is positioned on a lower side of the other overhanging portion 23B of the upper case 20a, thereby forming the other volume portion. On an upper face of the projecting portion 43B that faces the lower face of the overhanging portion 23B, a recessed first housing portion 45B for housing the other spring 60B is formed. On opposite end sides of the first housing portion 45B, slit-shaped recessed portions 46B, 46B in a pair into which the pushing portions 26B, 26B provided to the lower face of the overhanging portion 23B are inserted are respectively formed to be seamlessly connected to the housing portion 45B. On the other hand, on the lower face of the projecting portion 43B, a second housing portion 47B for housing the other contact 50B is formed. A projection 48B for fixing the contact 50B is formed on a ceiling face of the second housing portion 47B.

The contacts 50A and 50B of the set come into resilient contact from above with resistor circuits of a set formed on a surface of the mounting substrate 10 in a state in which the case 20 is fixed to the mounting substrate 10.

In the set of springs 60A and 60B, one spring 60A is disposed between the overhanging portion 23A of the upper case 20a and the projecting portion 43A of the moving body 40A and more specifically, housed in a slightly compressed state in the first housing portion 45A formed on the upper face of the projecting portion 43A. The pushing portions 26A, 26A formed on the lower face of the overhanging portion 23A are in contact with the opposite end sides of the spring 60A.

Similarly, the other spring 60B is disposed between the overhanging portion 23B of the upper case 20a and the projecting portion 43B of the moving body 40B and more specifically, housed in a slightly compressed state in the first housing portion 45B formed on the upper face of the projecting portion 43B. The pushing portions 26B, 26B formed on the lower face of the overhanging portion 23B are in contact with the opposite end sides of the spring 60B.

Next, a function of the pointing device according to the embodiment of the present invention will be described.

If the case 20 is fixed to the mounting substrate 10, the contacts 50A and 50B come into resilient contact from above with resistor circuits of the set formed on the surface of the mounting substrate 10, thereby forming the volume portions in the X-Y directions at the two side portions orthogonal to each other of the case 20. Therefore, it is unnecessary to electrically connect the device to the mounting substrate 10 by soldering or through a connector and it is possible to reduce the number of parts and the number of man-hours required for installation operation. Because the resistor circuits on the mounting substrate 10 are utilized, a substrate especially for forming the volumes can be removed from the device. As a result, the number of the parts can be reduced and a thickness of the case 20 can be also reduced.

When external force in a direction along the mounting substrate 10 is not applied to the operating body 30, the moving bodies 40A and 40B are retained in the origin positions by the springs 60A and 60B. As a result, the operating body 30 is also retained in the origin position.

When the operating body 30 is operated in the X direction, the moving body 40B in the lower stage moves in the X direction. In response to this, the contact 50B slides on the corresponding resistor circuit on the mounting substrate 10. As a result, an electric signal corresponding to a moving amount in the X direction is output and input into the electronic equipment for which the device is used. As the moving body 40B moves, the spring 60B moves in an axial direction. However, because movement of the spring 60B is prevented by one of the pushing portions 26B, 26B, the spring 60B is pushed and compressed in the axial direction. Therefore, if the external force applied to the operating body 30 is removed, the moving body 40B automatically returns to the origin position and as a result, the operating body 30 also automatically returns to the origin position.

If the operating body 30 is operated in the Y direction, the moving body 40A in the upper stage moves in the Y direction. In response to this, the contact 50A slides on the corresponding resistor circuit on the mounting substrate 10. As a result, an electric signal corresponding to a moving amount is output and input into the electronic equipment for which the device is used. As the moving body 40A moves, the spring 60A moves in an axial direction. However, because movement of the spring 60A is prevented by one of the pushing portions 26A, 26A, the spring 60A is pushed and compressed in the axial direction. Therefore, if the external force applied to the operating body 30 is removed, the moving body 40A automatically returns to the origin position and as a result, the operating body 30 also automatically returns to the origin position.

By combination of the above operations, the electric signals corresponding to a moving direction in the X-Y directions and the moving amount of the operating body 30 are input into the electronic equipment for which the device is used.

Because the spring 60A is housed between the overhanging portion 23A of the upper case 20a and the projecting portion 43A of the moving body 40A and the spring 60B is housed between the overhanging portion 23B of the upper case 20a and the projecting portion 43B of the moving body 40B, increase in an external size of the device due to provision of the springs 60A and 60B can be minimized.

Although the housing portions for housing the springs 60A and 60B are formed on the upper faces of the projecting portions 43A and 43B of the moving bodies 40A and 40B and the pushing portions for compressing the springs 60A and 60B in movement of the moving bodies 40A and 40B are formed on the lower faces of the overhanging portions 23A and 23B of the upper case 20a in the above embodiment, it is also possible that the housing portions for housing the springs 60A and 60B are formed on the lower faces of the overhanging portions 23A and 23B of the upper case 20a and that the pushing portions for compressing the springs 60A and 60B in movement of the moving bodies 40A and 40B are formed on the lower faces of the projecting portions 43A and 43B of the moving bodies 40A and 40B.

EFFECTS OF THE INVENTION

As described above, because the volumes are used as the signal output means, the pointing device of the present invention is smaller and less expensive than the device for which magnetic signal output means are used. Moreover, because the volumes are formed by causing respective one side portions of the moving bodies in the pair housed in the case to project to the outside of the case and bringing the contacts mounted to the respective projecting portions into sliding contact with resistor circuits formed on the surface of the substrate to which the case is fixed, the special substrate in the case is unnecessary. Furthermore, it is unnecessary to connect the device to the substrate by soldering or through the connector. Therefore, the number of the parts can be reduced substantially as compared with the prior-art device for which the volumes are used and the thickness of the device and the number of the man-hours required for installation operation can be also reduced.

By providing the springs for resiliently retaining the pair of moving bodies in the origin position, the operating body automatically returns to the origin position, thereby improving operability.

Because the two side portions substantially perpendicular to each other of the case overhang sideways over the respective projecting portions of the moving bodies in the pair and the springs are provided between the respective overhanging portions and the respective projecting portions, increase in size of the pointing device due to provision of the springs can be minimized.

What is claimed is:

1. A pointing device comprising a case fixed to a substrate, a sliding-type operating body that is mounted to said case for inputting a signal in X-Y directions and is slid in all directions around itself and along a surface of said substrate, a pair of moving bodies for moving linearly in X and Y directions as said operating body is slid, one end portion of each of said respective moving bodies projecting from the side of said case to face said surface of said substrate, and contacts in a pair that are respectively mounted to said one end portions of said moving bodies in said pair and that form volumes by coming into sliding contact with a resistor circuit formed on said surface of said substrate, wherein springs for resiliently retaining said moving bodies in said pair in an origin position are provided, and wherein two side portions substantially perpendicular to each other of said case overhang sideways over said respective one end portions of said moving bodies in said pair and said springs are respectively provided between said overhanging portions and said projecting portions.

* * * * *